Patented Nov. 20, 1934

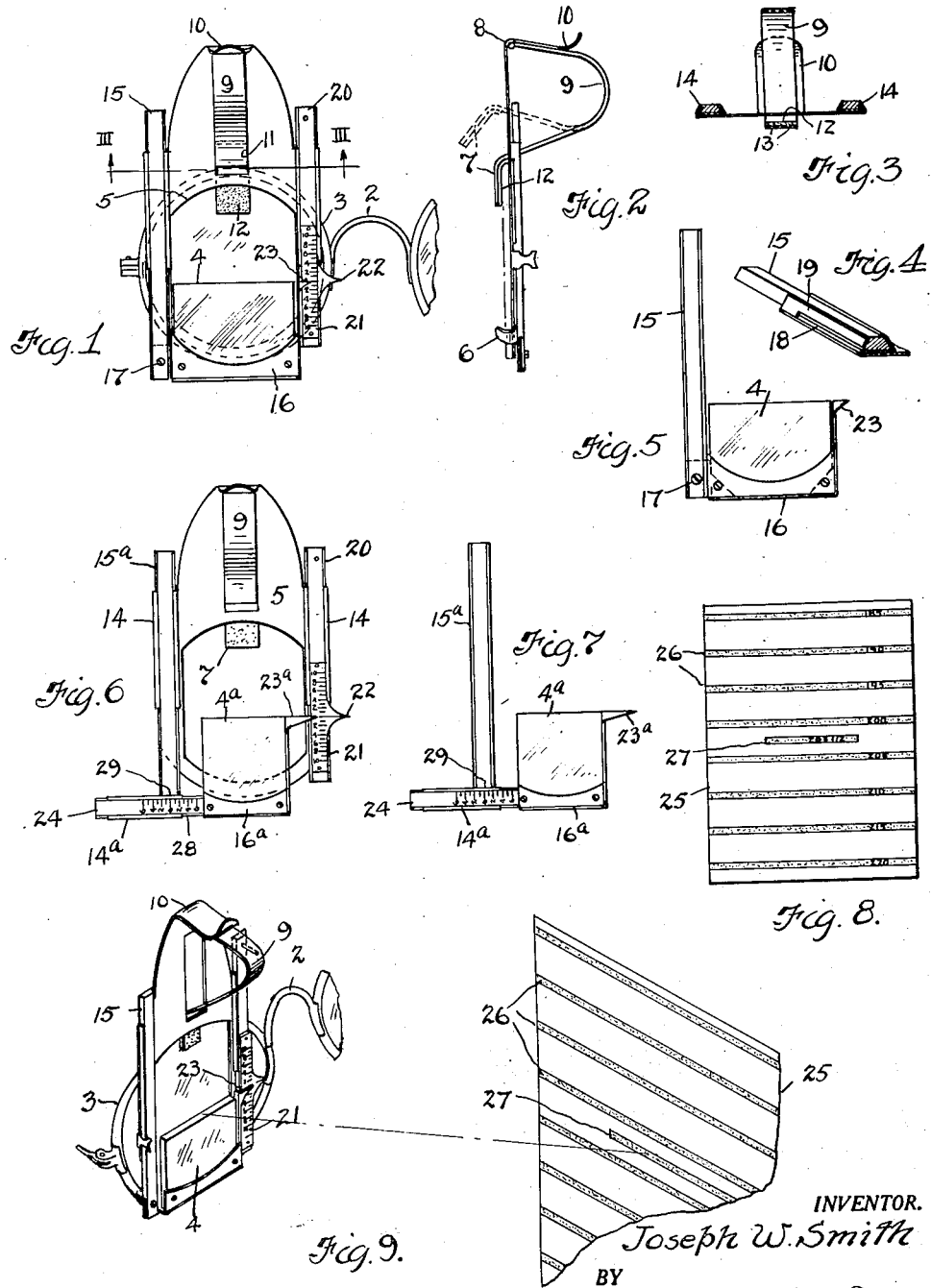

1,981,438

UNITED STATES PATENT OFFICE 1,981,438

EYE-TESTING APPARATUS

Joseph W. Smith, Cambridge, Ohio

Application July 16, 1931, Serial No. 551,104

12 Claims. (Cl. 88—20)

This invention relates to eye-testing apparatus, and more particularly to devices for determining refractive correction for bifocal segments; and it is among the objects of the invention to provide apparatus for accurately determining the proper position for the bifocal segment in any particular case. A further object is the provision of easily regulable mounting for test-glasses, facilitating placement and changes. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail certain structure illustrative of the invention, such being indicative however, of but a few of the various forms in which the principle of the invention may be employed.

In said annexed drawing:—

Fig. 1 is a front elevational view showing an embodiment of the invention; Fig. 2 is a vertical section of the same; Fig. 3 is a transverse section taken substantially on the line III—III, Fig. 1;
Fig. 4 is an isometric view, and Fig. 5 is a front elevational view of details; Fig. 6 is a front elevational view of a modification; Fig. 7 is a similar view of a detail; Fig. 8 is an elevational view of a line-chart in accordance with the invention, the scale being greatly reduced as compared with that of the other figures; and Fig. 9 is an isometric assembly view showing the testing segment and line-chart in use-association.

In Fig. 1 of the drawing there is shown a test-glass with mounting and holder, as applied to a spectacle frame of ordinary type, comprising the bridge 2 and rims 3. The general holding means is arranged to clamp over such spectacle frame, thereby presenting the testing-glass 4 in regulable position in the lower portion of the field of vision. To this end, a carrier, conveniently in the form of a skeletonized plate 5 may be dimensioned such as to abut the spectacle rim without obstructing the field of vision, and carry at certain points, preferably below, lugs or projections 6 hooked sufficiently to engage securely with the rim, while a clamping element 7 is presented opposite, such as to allow clamping and unclamping of the device onto the spectacle frame. However, instead of the device being clamped to a spectacle frame, it will be obvious that it can be just as readily clamped to a lens which is not surrounded by a frame. Conveniently, the clamping element 7 may be in the form of a sheet-metal projection extending in bowed form from the upper end of the plate 5, the latter being tapered in or domed toward the upper end 8, and the clamping member thence continuing in bow-contour 9 to the clamping extension 7 which is to directly engage over and back of the spectacle frame rim. A reinforcing or backing element 10 is desirably incorporated with the upper end of the clamping element, in order to afford a maximum of strength and resiliency with lightness of construction, the whole providing a bow-spring whose upper end is anchored and whose lower end is positioned for movement upwardly and back, clearance being allowed in the slot 11 in the plate, whereby the end 7 may be displaced for clamping and unclamping over the spectacle rim. The clamping element 7 preferably carries on its working face a cushioning element 12, which may be of leather, rubber, etc., and such element may be suitably affixed to the metal end, for instance perforations 13 being provided in the metal, facilitating fastening, sealing, and the like. At each side on the forward face of the plate 5, a slide-way is provided, this advantageously being in the form of a channel 14 having overhung edges. Within such channel at the left, as viewed in Fig. 1, a stem 15 slidably carries the testing-glass 4, being connected thereto at one margin, for instance by fore and aft clip-plates 16 with screw-fastened extension 17 to the stem 15. The stem 15 is of a section conforming to the overhung sides of the channel 14, and is movable up and down therein for regulation of the position of the test-glass. For holding the stem against accidental displacement, frictional or resilient engagement is provided by the channel wall, and this may be furthered by arranging a slit 18 at the junction of the side of the channel with the base thereof, such slit extending through a large portion of the channel expanse at one side. Correspondingly, the portion 19 of the channel wall separated by the slit 18 may act as a binding spring frictionally holding the slide-stem 15 in the position to which it is set. In the right-hand channel 14, as viewed in Fig. 1, a slide 20 of section corresponding to the channel, is likewise provided. This however carries at its lower end a scale 21 having at its center point an index or pointer 22. The clip-plate 16 mounting the test-glass 4, also carries an index or pointer 23, this registering over the scale 21.

The testing-glasses 4 are lens-power segments, also segments without lens-power but of a color-suppressing character, as will be referred to more particularly hereinafter.

In the form shown in Fig. 6, the similar skeletonized plate 5 is arranged to clamp over a spectacle frame, the clamping element 7 again being provided as an extension of the spring-like bow 9 carried from the upper end of the plate, which is preferably tapered or domed, and slide-ways 14 are again provided at each side, the one containing the vertically adjustable scale-slide 20 and the other containing the vertically adjustable stem 15a. At its lower end, the latter stem carries a guide-way 14a, which in its construction may be similar to that of the guide 14 already described. In the guide-way 14a, a slide-stem 24 is arranged, and this in turn carries the testing-glass 4a, this being mounted in clip-plate 16a, an extension from which provides the pointer 23a for registration over the scale 21. The testing-glass 4a is sufficiently narrow to allow lateral change of position, in regulation to the centering requirements of each particular patient tested. These segments 4a are again provided in both lens-power, and in color-suppressing non-lens glass.

For gauging the upper edge of the bifocal segment with respect to a lens to which it is to be applied, means for presenting a series of horizontal lines at reading distance is provided. This may most conveniently be incorporated on a chart 25, the lines 26 being printed or otherwise distinguished thereon, and desirably a short mid-line 27 being present. These lines 26, 27, may be black, but preferably are in color bearing such a relation to the test-glass that the latter may suppress that particular color as viewed therethrough. For instance, with the lines 26, 27 in red, the testing-glass 4 or 4a may be of a character suppressing red. The lines 26 may also be individually designated by numbers, as for example 185, 190, 195, 200, 205, 210, 215, 220, reading downwardly. The line 27 will then be fractionally numbered 203½.

In carrying out a test with the equipment, a spectacle frame of the form the patient is to wear is put on. The testing-glass support is then set onto this frame, the spring-bow 9 being pressed upwardly and inwardly as the device is placed into position with the projections 6 hooking under the spectacle frame rim, and the clamping element 7 is then allowed to spring back into place, coming into engagement against the upper rim. If the spectacle frame 3 already carries a lens having refractive correction as desired for distance use, the test-glass 4 may then be applied with lens-power for the additional correction for reading or near use. Such testing-glasses, as seen, may be readily inserted by directing the stem 15 upwardly into the guide-way 14, and these lens-power segments may be successively applied until the requisite near-correction is attained. For fine centering of the bifocal segments with respect to the distance-lenses, the laterally-adjustable test-glasses 4a may be employed, these allowing regulated movement to right or left, as required for particular centering in any instance, and by means of the scale 28 on the stem 24, with respect to the index-point 29 on the support-stem, an accurate measure for the centering may be attained. For the vertical positioning the chart 25 is placed before the patient, and with the head in customary reading position, the testing-glass 4 or 4a is adjusted up and down until the upper edge thereof is located at a suitable point with respect to the general distance-lens. The determinant for this may be taken as the mid-line, and as seen in Fig. 9, the line of vision sighting over the edge of the testing-glass 4 is such as to successively sweep the lines 26, 27 on the chart as the testing-glass is moved up or down, and correspondingly, the upper edge of the testing-glass, representing the ultimate bifocal segment, may be positioned with exactness, the actual position finally attained being shown by the pointer 23 or 23a on the scale 21. It will be understood that the slide 21 is adjusted primarily to the center-line for any given spectacle and is left there while using that particular frame; while the upper edge of the testing-glass, and the corresponding final position for the bifocal segment, may be adjusted with respect to the lines on the chart 25, using the lens segments as described foregoing. Generally in practice, better results are obtained by employing colored lines and color-suppressing testing-glasses. In this, with lines 26, 27 in red for instance, and testing-glasses 4 or 4a of a composition to suppress red, with adjustment of the testing-glass up and down, the line of sight over the testing-glass will show the corresponding portion of the chart as having red lines, while the lower portion viewed through the testing glass will appear to have black lines. Such sharp color-differentiation between the two sets of lines thus facilitates quick and accurate locating of the height proper for the upper edge of the testing-glass with respect to the general field of vision of the patient. This may then be read off on the scale 21, and the bifocal segment will be accordingly positioned with respect to the other lens.

Other modes of applying the principle of the invention may be employed, change being made as regards the details described, provided the means stated in any of the following claims, or the equivalent of such, be employed.

I therefore particularly point out and distinctly claim as my invention:—

1. Eye-testing apparatus, comprising a testing-glass for the lower portion of the field of vision, means for holding said glass, a frame for carrying said holding means, said holding means being adjustable on said frame so that the testing glass may be properly positioned relative to said spectacle frame, projections on said frame for engaging the periphery of a spectacle frame, and a movable clamping element for engaging the periphery of the spectacle frame at an opposite arcuate point, said clamping element having a cushioning facing.

2. Eye-testing apparatus, comprising a testing-glass for the lower portion of the field of vision, a support-stem connected to one margin of said glass, and a channel slide-way for said stem, said channel having overhung edges and a slit between the base of the channel and such an overhung edge.

3. Eye-testing apparatus, comprising a testing-glass for the lower portion of the field of vision, a support-stem connected to one margin of said glass, a slide-way for said stem, a carrier for said slide-way clampable to a spectacle, another slide-way spaced from the first-mentioned slide-way, and a scale-carrying stem mounted in such latter slide-way to co-act with the testing glass.

4. Eye-testing apparatus, comprising a testing glass for the lower portion of the field of vision, a support-stem connected to one margin of said glass, a slide-way for said stem, another stem upon which said slide-way is mounted in a transverse position, and a further slide-way for said last-named stem.

5. Eye-testing apparatus, comprising a testing-glass for the lower portion of the field of vision, a support-stem connected to one margin of said glass, a slide-way for said stem, another stem to which said slide-way is affixed transversely, a further slide-way for said last-named stem, and a carrier therefor clampable to a spectacle.

6. Eye-testing apparatus, comprising a testing-glass for the lower portion of the field of vision, a carrier clampable to a spectacle, a slide-way at each side on the anterior face of said carrier, a stem in one such slide-way carrying a scale, a pointer on said scale, a pointer on the mounting of said testing-glass, and a stem in the other slide-way for carrying said testing-glass.

7. Eye-testing apparatus, comprising a testing-glass for the lower portion of the field of vision, a carrier clampable to a spectacle, a slide-way at each side on the anterior face of said carrier, a stem in one such slide-way carrying a scale, a pointer on such scale, a stem connected to one margin of said testing-glass, a pointer in association with said testing-glass, a stem in the other mentioned slide-way, and a slide-way affixed to said stem transversely for receiving the testing-glass supporting stem.

8. Eye-testing apparatus, comprising a testing-glass for the lower portion of the field of vision, and means for positioning the testing-glass at the lower portion of the field of vision, said means including a carrier clampable to a spectacle, said carrier embodying a skeletonized plate, a resilient clamp on the upper portion of said carrier for engaging the spectacle, and a slide-way at each side on the anterior face of said carrier.

9. Eye-testing apparatus, comprising a testing-glass for the lower portion of the field of vision, a carrier clampable with a spectacle, a bowed clamping member fastened to the upper portion of said carrier and having its free end extending through a slot-way in the carrier whereby to engage a spectacle, a slide-way at each side on the anterior face of said carrier, and a support stem for said testing-glass engageable in one such slideway.

10. Eye-testing apparatus, comprising a testing-glass for the lower portion of the field of vision, a carrier engageable with a spectacle, said carrier embodying a skeletonized plate, projections on the lower portion thereof for engaging a spectacle, a bowed clamping element fastened to the upper portion of said plate and having its free end extending through a slot in the plate, a slide-way at each side on the anterior face of said carrier, said slide-ways being of channel form with overhung edges, a slit between the base and one side of each such slide-way whereby to provide a resilient frictionally engaging portion, a stem in each such slide-way, a scale carried by one such stem, and a testing-glass carried by the other.

11. Eye-testing apparatus, comprising a carrier, means for clamping said carrier to a spectacle, a slide-way at each side on the anterior face of said carrier, a stem engageable in each such slide-way, one stem supporting a testing-glass and the other stem carrying a scale, a pointer on said scale, a projection on the upper end of the said scale-carrying stem, and a pointer carried with the testing-glass.

12. A device for determining the proper relation between the vision fields of multifocal ophthalmic lenses, said device being of such a type that it may be readily applied to or removed from a regular spectacle frame or lens, said device comprising a framework having means for resiliently gripping the lens or spectacle frame to which it is applied, a testing segment member adapted to be adjusted on said framework relative to said lens or spectacle frame to determine the proper position of the reading segment relative to said lens or said spectacle frame, said testing segment member being vertically adjustable on said framework, means for holding said segment member in any position to which it is adjusted on said framework, means for indicating the vertical position of said segment relative to said lens or the lens which is to be mounted in said spectacle frame, said means comprising a scale carried by said framework, and means for vertically adjusting said scale on said framework.

JOSEPH W. SMITH.